United States Patent [19]

Moradi-Araghi

[11] Patent Number: 5,905,100
[45] Date of Patent: May 18, 1999

[54] GELATION OF ACRYLAMIDE-CONTAINING POLYMERS WITH HEXAMETHYLENETETRAMINE AND AN AMINOBENZOIC ACID COMPOUND OR PHENOL

[75] Inventor: Ahmad Moradi-Araghi, Bartlesville, Okla.

[73] Assignee: Phillips Petroleum Company, Bartlesville, Okla.

[21] Appl. No.: 07/848,884

[22] Filed: Mar. 10, 1992

Related U.S. Application Data

[63] Continuation-in-part of application No. 07/580,066, Sep. 10, 1990, Pat. No. 5,179,136.
[51] Int. Cl.⁶ .................................................. C09K 7/00
[52] U.S. Cl. .......................... 523/130; 524/238; 524/239; 524/240; 525/379
[58] Field of Search ............................. 523/130; 524/238, 524/239, 240, 234; 525/379

[56] References Cited

U.S. PATENT DOCUMENTS

| | | | |
|---|---|---|---|
| 4,018,847 | 4/1977 | Messerly | 525/481 |
| 4,167,500 | 9/1979 | Jazenski | 260/29.3 |
| 4,440,228 | 4/1984 | Swanson | 166/274 |
| 4,476,033 | 10/1984 | Josephson | 252/8.55 |
| 4,799,548 | 1/1989 | Mumallah et al. | 166/288 |
| 4,822,842 | 4/1989 | Mumallah et al. | 524/346 |
| 4,934,456 | 6/1990 | Moradi-Araghi | 166/270 |
| 5,043,364 | 8/1991 | Moradi-Araghi et al. | 523/130 |

*Primary Examiner*—Marion E. McCamish
*Assistant Examiner*—John J. Guarriello
*Attorney, Agent, or Firm*—Lucas K. Shay

[57] ABSTRACT

A novel composition and process are disclosed for forming crosslinked gels at elevated temperatures utilizing a novel crosslinking agent system containing hexamethylenetetramine, a water dispersible aminobenzoic acid compound or phenol, an acrylamide-containing polymer, and water.

4 Claims, No Drawings

GELATION OF ACRYLAMIDE-CONTAINING POLYMERS WITH HEXAMETHYLENETETRAMINE AND AN AMINOBENZOIC ACID COMPOUND OR PHENOL

This is a continuation-in-part of application Ser. No. 07/580,066 filed Sep. 10, 1990, now U.S. Pat. No. 5,179,136, The disclosure of which is incorporated by reference.

FIELD OF THE INVENTION

The present invention relates to gelation of water-soluble polymers by organic crosslinking agents and to a gelable composition useful in oil field operations.

BACKGROUND OF THE INVENTION

It is well known to those skilled in the art that gelled or crosslinked water-soluble polymers are useful in enhanced oil recovery operations. They have been used to alter the permeability of underground formations in order to enhance the effectiveness of water flooding operations. Polymers along with an appropriate crosslinking system are injected in an aqueous solution into the formation. The polymers then permeate into and gel in the regions having the highest water permeability. A conventional crosslinking system consists of phenol and formaldehyde. Any fluids injected into the formation in subsequent water flooding operations, will then be diverted away from the regions in which the gel formed to areas containing unswept oil.

Although this technique is effective in enhancing hydrocarbon production, it does have problems. One of the primary problems facing the use of conventional crosslinking system is that formaldehyde is carcinogenic and is not environmentally acceptable.

It would therefore be a valuable contribution to the art to develop an organic crosslinking system which is more environmentally acceptable and forms comparable or better gels, compared with the phenol-formaldehyde crosslinking system, for oil field operations.

SUMMARY OF THE INVENTION

Thus, it is an object of the present invention to provide an environmentally substantially less toxic crosslinking system.

It is also an object of the present invention to provide a process for reducing the permeability of high temperature subterranean formation.

It is another object of the present invention to provide an improved gel system for use in oil field operations.

It is a further object of the present invention to provide novel gels formed with the novel crosslinking system and water-soluble polymers.

Other aspects and objects of this invention will become apparent here and after as the invention is more fully described in the following summary of the invention and detailed description of the invention, examples, and claims.

According to the present invention, a gelable composition is provided which comprises: (1) hexamethylenetetramine; (2) a crosslinking component selected from the group consisting of a water dispersible aminobenzoic acid compound and phenol; (3) a water soluble acrylamide-containing polymer; and (4) water.

According to another embodiment of the present invention, a process for reducing the permeability of a watered-out or oil-depleted zones in high temperature subterranean formation comprises injecting a gelable composition comprising: (1) hexamethylenetetramine; (2) a crosslinking component selected from the group consisting of a water dispersible aminobenzoic acid compound and phenol; (3) a water soluble acrylamide-containing polymer; and (4) water; into the formation and the gelable composition forms a gel in the formation.

DETAILED DESCRIPTION OF THE INVENTION

The aminobenzoic acid compounds useful for the present invention are water dispersible. The term "water dispersible" used herein is to describe a component of the composition that is truly water soluble or is dispersible in water to form a suspension. Suitable aminobenzoic acid compounds include, o-aminobenzoic acid, p-aminobenzoic acid, 2,4-diaminobenzoic acid, 2,3-diaminobenzoic acid, 3,4-diaminobenzoic acid, 3,5-diaminobenzoic acid, 5-aminophthalic acid, 3-aminophthalic acid, 4-aminophthalic and mixtures thereof. Presently preferred water dispersible aminobenzoic acid compounds are p-aminobenzoic acid and o-aminobenzoic acid.

As used in this application, the term "water soluble acrylamide-containing polymer" refers to those polymers which are homopolymers, copolymers, or terpolymers, and are truly water soluble or those which are dispersible in water or other aqueous medium to form a colloidal suspension which can be pumped into a formation and gelled therein.

The water soluble acrylamide-containing polymers which are suitable for use in the present invention include those which contain from 5 to 100 mole percent, preferably 5 to 50 mole percent, and most preferably 5 to 30 mole percent of at least one monomer of the formula

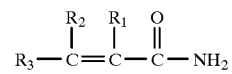

wherein $R_1$, $R_2$, and $R_3$ are selected from the group consisting of hydrogen or alkyl groups containing from 1 to 3 carbon atoms, of which acrylamide is the preferred example; and from 0 to 95 mole percent, preferably 50 to 95 mole percent, and most preferably 70 to 95 mole percent of at least one monomer selected from the group consisting of: (A) those monomers represented by the formula:

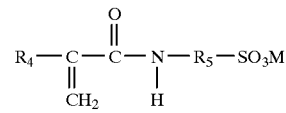

wherein $R_4$ is selected from the group consisting of hydrogen or alkyl radicals containing from 1 to 6 carbon atoms, $R_5$ is selected from the group consisting of alkylene radicals containing from 1 to 6 carbon atoms or an arylene radical containing from 6 to 10 carbon atoms, and M is selected from the groups consisting of hydrogen, ammonium, potassium, or sodium, of which 2-acrylamido-2-methylpropane sulfonic acid or sodium 2-acrylamide-2-methylpropane sulfonate are the preferred examples; or (B) monomers represented by the formula:

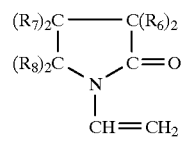

where $R_6$, $R_7$ and $R_8$ are independently selected from the group consisting of hydrogen or alkyl groups containing from 1 to 2 carbon atoms of which N-vinyl-2-pyrrolidone is the preferred example; or (C) at least one monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonate, vinylacetate, acrylonitrile, methacrylonitrile, vinyl alkyl ether, vinyl chloride, maleic anhydride, vinyl substituted cationic quaternary ammonium compounds, (acryloyloxy-ethyl)diethylmethylammonium methyl sulfate; or (D) mixtures thereof.

The polymerization of any of the above described monomers and their resulting polymers are well known to those skilled in the art. There are numerous references which disclose methods of polymerizing these monomers. For example, See U.S. Pat. No. 4,244,826.

The manner in which these monomers are polymerized into water soluble polymers or the resulting polymer is not critical to the practice of the present invention. Polymerization can be initiated by chemicals, irradiation, or any other techniques known to those skilled in the art.

The molecular weight of the water soluble polymers utilized in the present invention is not critical. It is presently preferred, however, that the polymer have a molecular weight of at least about 100,000 and more preferably 100,000 to 20,000,000. The upper limit is not critical as long as the polymer is still water dispersible and can be pumped into the formation.

The presently preferred class of water soluble polymers are those selected from the group consisting of homopolymers of acrylamide, homopolymers of methacrylamide, copolymers of acrylamide and N,N-dimethylacrylamide, copolymers of acrylamide and acrylic acid, copolymers of acrylamide and potassium acrylate, copolymers of acrylamide and methacrylamide, copolymers of acrylamide and sodium acrylate, copolymers of acrylamide and sodium 2-acrylamido-2-methylpropane sulfonate, copolymers of acrylamide and N-vinyl-2-pyrrolidone, terpolymers of acrylamide, N,N-dimethylacrylamide, and sodium 2-acrylamido-2-methylpropane sulfonate and terpolymers of acrylamide, N-vinyl-2-pyrrolidone, and 2-acrylamido-2-methylpropane sulfonate. The ratio of the monomers in the above-described polymers is not critical; provided, however, that at least 5 mole % of acrylamide is present in the above-described polymers.

Particularly preferred are homopolymers of acrylamide, copolymers of acrylamide and sodium acrylate, copolymers of acrylamide and sodium 2-acrylamido-2-methylpropane sulfonate, copolymers of acrylamide and N-vinyl-2-pyrrolidone and a terpolymers of N-vinyl-2-pyrrolidone, acrylamide and sodium 2-acrylamido-2-methylpropane sulfonate. However, other polymers with more subunits may also be utilized in the practice of this invention. Additionally within the scope of this invention is the use of combinations of homopolymers, copolymers and terpolymers utilizing the above listed monomers.

The water dispersible aminobenzoic acid compound or phenol is present in the composition in the range of about 0.005 to about 5.0 weight percent, preferably about 0.01 to about 2.0 weight percent, and most preferably in the range of 0.03 to 1.0 weight percent based on the total weight of the composition. The hexamethylenetetramine is present in the composition in the range of about 0.005 to about 5.0 weight percent, preferably about 0.01 to about 2.0 weight percent, and most preferably in the range of 0.03 to 1.0 weight percent based on the total weight of the composition.

The water soluble acrylamide-containing polymer is present in the composition in the amount of about 0.05 to about 10 weight percent, preferably about 0.1 to about 5 weight percent, and most preferably 0.2 to 4 weight percent based on the total weight of the composition. The concentration of polymer in the composition depends to some degree upon the molecular weight of the polymer. A high molecular weight results in a higher viscosity of the resulting gel for a particular concentration of polymer. Water makes up the rest of the composition.

Any suitable method can be employed for preparing the composition of the invention. Thus, any suitable mixing technique or order of addition of the components of the composition to each other can be employed. However, it is generally preferred that the polymer be dispersed in water before contacting the polymer with the other components. The mixing order can vary with the type of polymer used.

The use of gelled polymers to alter the water permeability of underground formations is well known to those skilled in the art. Generally, an aqueous solution containing the polymer and a crosslinking agent is pumped into the formation so that it can diffuse into the more water swept portions of the formation and alter water permeability by gelling therein.

The present invention can be used in a similar manner. An aqueous solution containing hexamethylenetetramine, the water soluble polymer, and aminobenzoic acid compound or phenol can be pumped into the formation so that it alters the water permeability of the formation in a similar manner when gelation takes place. The aqueous solution containing hexamethylenetetramine, the water soluble polymer, and aminobenzoic acid compound or phenol can be pumped into the formation in one slug, or alternatively the components may be sequentially injected in a manner to provide an appropriate concentration in the formation.

The nature of the underground formation treated is not critical to the practice of the present invention. The organic crosslinkers will gel the water-soluble polymers in, and the above described gelable composition can be injected into, fresh water, salt water, or brines, as well as at a temperature range of from about 150° F. to about 350° F., and preferably in formations with a temperature of about 200° F. to about 300° F.

The following specific examples are intended to illustrate the advantages of this invention, but are not intended to unduly limit this invention.

EXAMPLE I

The purpose of this example is to illustrate the gelation of a water-soluble polymer by phenol and formaldehyde and to use this example as a control.

A 0.7 percent solution of a terpolymer composed of 30 wt % of N-vinyl-2-pyrrolidone, 15 wt % of acrylamide, and 55 wt % of sodium 2-acrylamido-2-methylpropane sulfonate was prepared by mixing 16.3 ml of an inverse emulsion which contained 32.4 wt % of the active terpolymer with 500 ml of synthetic sea water. The synthetic sea water used has the following formula:

| | | |
|---|---:|---|
| $NaHCO_3$ | 3.69 | grams |
| $Na_2SO_4$ | 77.19 | grams |
| NaCl | 429.00 | grams |
| $CaCl_2.2H_2O$ | 29.58 | grams |
| $MgCl_2.6H_2O$ | 193.92 | grams |
| distilled $H_2O$ | q.s. to 18 | liters |

An aliquot of 88% phenol (0.233 g) and 0.511 ml of 37% formaldehyde were added to 100 ml of the polymer and synthetic sea water mixture described above, to provide a concentration of 2,000 ppm each of phenol and formaldehyde. Similarly, 0.582 g of phenol and 1.278 ml of formaldehyde were added to 100 ml of the polymer and synthetic sea water mixture to generate a concentration of 5,000 ppm each of phenol and formaldehyde.

Then 20 ml samples of each solution were placed in three ampules (2.2 cm by 22.5 cm). The six ampules were sealed under nitrogen and then placed upright in compartmented aluminum boxes with relief holes and placed in ovens heated to and held at 200° F., 250° F., and 300° F. Periodically, the ampules were removed from the oven and the mechanical strength of the gels was determined behind a protective shield.

As crosslinking developed, small microgels or granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each ampule horizontally behind a shield for safety, allowing the hot gelling composition to move to its equilibrium position and then measuring the length of the tongue formed. As gelation progressed with time, stronger gels and shorter tongue lengths were developed. Additionally, liquid content in the ampules were measured by the length of the liquid with the ampules in vertical positions. The mechanical strength is expressed mathematically as $$\text{Percent Gel Strength} = (AL-TL) \times 100/AL$$

where AL equals ampule length (in centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0. The tongue length results are shown in Table I.

TABLE I

Gelation of 0.7% Terpolymer Solution in Synthetic Seawater with Phenol and Formaldehyde at 200° F., 250° F. and 300° F.

| Temp | Tongue Length or Gel Length (GL) in Centimeters | | | | | |
|---|---|---|---|---|---|---|
| X-linker | 200° F. | | 250° F. | | 300° F. | |
| Conc* (ppm) | 2,000 | 5,000 | 2,000 | 5,000 | 2,000 | 5,000 |
| Aging Time (days) | | | | | | |
| 0.3 | T | VT | 19.6 | 14.5 | 13.3 | 15.8 |
| 0.9 | VSG | 16.6 | 13.5 | 12.5 | 5.0 | 1.5 |
| 1.0 | VSG | 16.6 | 14.0 | 13.0 | 4.6 | 1.3 |
| 1.1 | VSG | 16.5 | 14.6 | 13.0 | 5.0 | 1.2 |
| 1.8 | 15.6 | 12.5 | 10.6 | 11.5 | 3.2 | 1.1 |
| 2.1 | 16.0 | 12.5 | 12.2 | 7.8 | 2.8 | 2.2 |
| 2.8 | 15.2 | 11.2 | 9.5 | 9.5 | 2.6 | 1.8 |
| 3.1 | 14.8 | 6.8 | 7.7 | 9.3 | 0.9 | 0.8 |
| 4.0 | 11.8 | 5.2 | 7.0 | 4.7 | 2.2 | 1.2 |
| 6.9 | 5.5 | 6.5 | 4.3 | 5.0 | 0.9 | 3.0 + 0.5L |
| 8.1 | 7.0 | 7.0 | 6.0 | 3.8 | 1.0 | 7.0GL + 0.5L |
| 8.8 | 7.6 | 7.5 | 7.5 | 4.0 | 1.0 | 5.0GL + 0.5L |
| 9.9 | 7.5 | 7.8 | 5.9 | 3.5 | 0.8 | — |
| 13.8 | 9.5 | 7.5 | 3.4 | 2.4 | 0.7 | 2.1GL + 1.0L |
| 21.9 | 9.0 | 7.5 | 3.2 | 2.0 | 4.0 | 3.0GL + 1.0L |
| 28.0 | 10.5 | 11.2 | 2.2 | 1.8 | 11.7GL + 0.2L | 7.5GL + 1.7L |
| 35.0 | 11.5 | 10.5 | 2.6 | 2.0 | 11.5GL + 0.3L | 7.3GL + 2.0L |
| 63.0 | 10.8 | 10.5 | 2.5 | 2.5 + 0.1L | 9.2GL + 1.0L | 7.0GL + 2.0L |
| 93.0 | 11.4 | 11.5GL | 3.5 | 3.3 + 0.1L | 9.4GL + 1.5L | 6.5GL + 4.0L |
| 157.0 | — | — | 6.0 | 5.0 + 0.2L | 8.3GL + 1.5L | 5.6GL + 2.7L |
| 197.0 | 12.5 | 12.7 | 6.5 | 6.3 + 0.3L | 8.8GL + 1.5L | 5.7GL + 2.7L |
| 233.0 | 13.5 | 12.6 | 7.2 | 6.8 + 0.3L | 9.0GL + 1.5L | 6.4GL + 4.0L |
| 265.0 | 12.6GL | 15.9GL | 6.5 | 7.1 + 0.3L | 9.3GL + 1.5L | Terminated |
| 303.0 | 17.0GL | 12.7GL | 9.7 | 7.3 + 0.3L | 9.3GL + 1.5L | — |
| 379.0 | 14.4GL + 0.2L | 16.3GL | 8.5 | 7.6 + 0.3L | 10.8GL + 1.6L | — |
| 510.0 | 13.7GL + 0.4L | 15.6GL | 10.3 | 7.9 + 0.3L | 14.0GL + 1.8L | — |
| 562.0 | 17.0GL + 0.5L | 15.7GL | 11.2 | 8.7 + 0.3L | 6.9GL + 2.7L | — |
| 633.0 | 18.6GL + 0.4L | 15.6GL | 12.6 | 9.3 + 0.4L | 7.4GL + 2.7L | — |
| 791.0 | 16.6GL + 0.2L | 13.7GL | 12.5 + 0.2L | 8.7 + 0.5L | 7.7GL + 3.7L | — |
| 912.0 | 19.0GL + 0.4L | 16.6GL | 16.2GL + 0.2L | 9.9 + 0.4L | 6.9GL + 4.0L | — |
| 1109.0 | 18.7GL + 0.4L | 16.2GL | 16.0GL + 0.3L | 10.5 + 0.4L | 7.0GL + 4.0L | — |
| 1289.0 | 18.6GL + 0.4L | 16.5GL | 14.7GL + 0.3L | 11.4 + 0.3L | Terminated | — |
| 1535.0 | 18.2GL + 0.4L | 15.3GL | 14.1GL + 0.4L | 12.8GL + 0.4L | — | — |

*The numbers given represent the concentration of each crosslinker.
T = Thick, VT = Very Thick, VSG = Very Slight Gel.
GL = Gel Length, L = the height of liquid separated from the gel, measured when ampule was at vertical position.

Table I shows that after 1535 days at 200° F. in the presence of 2,000 ppm each of phenol and formaldehyde, relatively poor gel (based on the gel length of 18.2 cm and the liquid content of 0.4 cm). The higher the liquid content, the more syneresis was. Syneresis is an undesirable characteristics. Similarly, at 5,000 ppm concentration each of phenol and formaldehyde, faster gelation occurred and shorter gels were formed.

Table I also shows that, at higher temperature (250° F.) and at a given crosslinker concentration (2,000 ppm), the gelation rate increased resulting in decreased tongue length indicating improved gel strength. However, when the temperature was 300° F., excessive syneresis was observed in as short as 63 days (1.0 cm liquid) and then at 1109 days, the gel gave 4.0 cm of liquid indicating a severe syneresis.

EXAMPLE II

This example demonstrates that replacing formaldehyde with hexamethylenetetramine (HMTA) resulted in comparable gelation.

The runs were carried out the same as those described in Example I with the exception that HMTA was used in place of formaldehyde in the composition. The results are shown in Table II.

Table II shows that the gels produced with HMTA and phenol as crosslinkers are very comparable in quality to those made with phenol-formaldehyde crosslinking system at equal concentrations and temperatures.

EXAMPLE III

This example demonstrates that the invention composition comprising HMTA and an aminobenzoic acid compound produced superior gels to those made with phenol and formaldehyde or with phenol and HMTA as crosslinkers.

The runs were carried out the same as those described in Example I except that the crosslinking agents were p-aminobenzoic acid and HMTA and that 3,500 ppm instead of 5,000 ppm concentration of crosslinkers was tested. The test results are shown in Table III.

TABLE II

Gelation of 0.7% Terpolymer in Synthetic Seawater with Phenol and Hexamethylenetetramine at 200° F., 250° F. and 300° F.

| Temp | Tongue Length or Gel Length (GL) in Centimeters | | | | | |
|---|---|---|---|---|---|---|
| X-linker | 200° F. | | 250° F. | | 300° F. | |
| Conc* (ppm) | 2,000 | 5,000 | 2,000 | 5,000 | 2,000 | 5,000 |
| Aging Time (days) | | | | | | |
| 0.3 | T | VT | PG | 21.8 | 22.1 | 23.0 |
| 0.9 | VSG | PG | 13.5 | 6.5 | 13.2 | 5.7 |
| 1.0 | VSG | 21.6 | 13.5 | 8.0 | 14.0 | Terminated |
| 1.1 | VSG | 20.4 | 13.0 | 5.2 | 13.8 | — |
| 1.8 | PG | 20.0 | 12.4 | 5.5 | 11.2 | — |
| 2.1 | 15.2 | 19.1 | 11.4 | 5.8 | 9.7 | — |
| 2.8 | 18.0 | 18.2 | 6.7 | 6.0 | 9.7 | — |
| 3.1 | 18.0 | 19.4 | 11.0 | 5.8 | 9.5 | — |
| 4.0 | 14.7 | 10.0 | 7.6 | 6.0 | 9.6 | — |
| 6.9 | 8.0 | 6.5 | 9.8 | 7.5 | 9.8 | — |
| 8.1 | 8.0 | 5.8 | 7.4 | 6.1 | 8.9 | — |
| 8.8 | 13.8 | 5.8 | 9.8 | 7.0 | 7.0 | — |
| 9.9 | 10.5 | 6.2 | 9.0 | 7.6 | 7.4 | — |
| 13.8 | 14.5 | 8.5 | 8.5 | 5.0 | 7.0 | — |
| 21.9 | 8.3 | 9.8 | 8.0 | 4.5 | 6.0 | — |
| 28.0 | 14.2 | 10.0 | 5.2 | 4.5 | 4.7 | — |
| 35.0 | 11.0 | 10.0 | 7.0 | 3.3 | 8.5 | — |
| 63.0 | 10.5 | 10.5 | 8.0 | 3.0 | 4.0 | — |
| 93.0 | 9.3 | 14.5 | 6.2 + 0.2L | 3.4 + 0.1L | 14.0GL + 0.8L | — |
| 157.0 | — | — | 12.3 | 2.0 | 9.7GL + 2.1L | — |
| 197.0 | 5.9 | 5.4 | 4.5 + 0.3L | 1.7 | 12.5GL + 2.5L | — |
| 233.0 | 7.2 | 3.8 | 8.6 + 0.8L | 2.9 | 7.5GL + 3.7L | — |
| 265.0 | 7.7 | 11.0 | 9.3 + 0.8L | 4.5 | 10.6GL + 3.6L | — |
| 303.0 | 4.3 | 7.8 | 11.5 + 0.9L | 2.8 | Terminated | — |
| 379.0 | 17.0GL | 11.0 | 10.6GL + 1.1L | 3.9 | — | — |
| 510.0 | 11.2GL + 1.5L | 7.8 + 0.3L | 10.5GL + 1.1L | 4.0 + 0.3L | — | — |
| 562.0 | 12.5GL + 1.5L | 8.9 + 0.5L | 11.3GL + 1.1L | 4.4 + 0.4L | — | — |
| 633.0 | 14.1GL + 1.7L | 9.4 + 0.4L | 11.1GL + 1.1L | 3.7 + 0.3L | — | — |
| 791.0 | 12.7GL + 1.5L | 7.5 + 0.3L | 11.0GL + 1.0L | 5.2 + 0.2L | — | — |
| 912.0 | 13.5GL + 1.7L | 10.3 + 0.SL | 14.0GL + 1.1L | S.5 + 0.3L | — | — |
| 1109.0 | 12.9GL + 2.2L | 9.9 + 0.6L | 11.1GL + 1.4L | 5.8 + 0.4L | — | — |
| 1289.0 | 12.7GL + 1.9L | 9.5 + 0.5L | 13.5GL + 1.2L | 12.4GL + 0.3L | | |
| 1535.0 | 11.9GL + 1.9L | 9.4 + 0.6L | 11.3GL + 1.8L | 12.2GL + 0.2L | | |

*The numbers given represent the concentration of each crosslinker.
T = Thick, VT = Very Thick, VSG = Very Slight Gel, PG = Partial Gel.
GL = Gel Length, L = the height of liquid separated from the gel, measured when ampule was at vertical position.

TABLE III

Gelatin of 0.7% Terpolymer Solution in Synthetic Seawater with p-Aminobenzoic Acid and Hexamethylenetetramine at 200° F., 250° F. and 300° F.

| Temp | 200° F. | | 250° F. | | 300° F. | |
|---|---|---|---|---|---|---|
| X-linker Conc* (ppm) | | | Tongue Length or Gel Length (GL) in Centimeters | | | |
| Aging Time (days) | 2,000 | 3,500 | 2,000 | 3,500 | 2,000 | 3,500 |
| 0.2 | T | T | T | T | T | T |
| 0.9 | T | VT | T | T | T | T |
| 1.2 | T | VT | T | T | T | T |
| 1.9 | VT | VT | T | T | T | T |
| 2.2 | VT | VT | T | T | T | T |
| 5.0 | VT | VT | VSG | VSG | PG | 3.0 |
| 8.0 | T | VT | T | VT | 9.0 | 1.1 |
| 12.9 | T | VT | T | VT | 3.0 | 0.5 |
| 15.9 | T | T | T | VT | 0.6 | 0.7 |
| 22.9 | T | T | T | VT | 0.6 | 0.0 |
| 30.0 | T | T | VT | 19.0 | 3.6 | 0.0 |
| 61.0 | T | T | 0.0 | 0.0 | 0.0 | 0.0 |
| 90.0 | T | T | 0.0 | 0.0 | 2.5 | 0.0 |
| 111.0 | T | T | 0.0 | 0.0 | 4.1 | 0.0 |
| 121.0 | T | VSG | 0.0 | 0.0 | 3.8 | 0.0 |
| 156.0 | T | VSG | 0.0 | 0.0 | 4.5 | 0.0 |
| 280.0 | 7.1 | 5.7 | 0.0 | 0.0 | 0.0 | 0.0 |
| 383.0 | 2.4 | 1.5 | 0.0 | 0.0 | 1.8 | 0.0 |
| 551.0 | 1.0 | 0.0 | 0.0 | 0.0 | 2.0 | 0.0 |
| 777.0 | 1.8 | 0.0 | 0.0 | 3.9 | 3.5 | 12.6 GL + 0.6 L |
| 1023.0 | 1.0 | 0.0 | 0.0 | 4.1 + 1.5 L | 3.7 | 8.7 GL + 0.6 L |

*The numbers given represent the concentration of each crosslinker.
VSG = very Sight Gel, T = Thick, VT = Very Thick, PG = Partial Gel.
L = the height of liquid separated from the gel, measured when ampule was at vertical position.

The results shown in Table III clearly show that substantially stronger (i.e. shorter tongue lengths) gels were obtained, when compared with the results of Table I or Table II. Unlike phenol and formaldehyde system, the invention composition formed gels that withstood high temperature at 300° F. Additionally, o-aminobenzoic acid was also found to be as an effective crosslinker as p-aminobenzoic acid at 250° F. with the test done exactly the same as that for p-aminobenzoic acid. It is therefore concluded that an aminobenzoic acid is an effective crosslinker.

EXAMPLE IV

This example illustrates that glyoxal, a formaldehyde precursor that releases formaldehyde upon heating, is not a suitable crosslinking agent.

The runs were carried out the same as those described in Example II except that glyoxal was used in place of HMTA. The results shown in Table IV below indicate that little or no gels were formed. It is concluded that a formaldehyde precursor that generates formaldehyde in-situ is not necessarily a crosslinking agent.

TABLE IV

Gelation of 0.7% Terpolymer in Synthetic Seawater with Phenol and Glyoxal at 200° F., 250° F. and 300° F.

| | 200° F. | | 250° F. | | 300° F. | |
|---|---|---|---|---|---|---|
| X-linker | Tongue Length or Gel Length (GL) in Centimeters | | | | | |
| Conc* (ppm) | 2,000 | 3,500 | 2,000 | 3,500 | 2,000 | 3,500 |
| Aging Time (days) | | | | | | |
| 0.2 | VT | VT | T | T | T | T |
| 0.9 | T | VT | T | T | NG | NG |
| 1.1 | T | T | T | T | NG | NG |
| 1.3 | T | T | T | T | NG | NG |
| 4.0 | T | T | T | VSG | NG | NG |
| 6.0 | T | T | NG | VSG | NG | NG |
| 8.0 | T | T | NG | VSG | NG | NG |
| 12.0 | T | T | NG | VSG | NG | NG |
| 15.0 | T | VT | NG | VSG | NG | NG |
| 19.0 | T | T | NG | VSG | NG | NG |
| 32.0 | NG | NG | NG | VSG | NG | NG |
| 50.0 | NG | NG | NG | VSG | NG | NG |
| 99.0 | NG | VSG | NG | VSG | NG | NG |
| 203.0 | Terminated | S-PG | Terminated | VSG | Terminated | Terminated |
| 277.0 | — | S-PG | — | VSG | — | — |
| 323.0 | — | PG + 0.5L | — | Terminated | — | — |
| 372.0 | — | PG + 0.3L | — | — | — | — |
| 424.0 | — | PG + 0.3L | — | — | — | — |

TABLE IV-continued

Gelation of 0.7% Terpolymer in Synthetic Seawater with
Phenol and Glyoxal at 200° F., 250° F. and 300° F.

| X-linker | \multicolumn{2}{c}{200° F.} | | \multicolumn{2}{c}{250° F.} | | \multicolumn{2}{c}{300° F.} |

| X-linker Conc* (ppm) | 2,000 | 3,500 | 2,000 | 3,500 | 2,000 | 3,500 |
|---|---|---|---|---|---|---|
| 530.0 | — | PG + 0.3L | — | — | — | — |
| 635.0 | — | PG + 0.2L | — | — | — | — |
| 862.0 | — | PG + 0.2L | — | — | — | — |
| 1033.0 | — | PG + 0.2L | — | — | — | — |
| 1267.0 | — | S-PG + 0.2L | — | — | — | — |

*The numbers given represent the concentration of each crosslinker.
T = Thick, VT = Very Thick, NG = No Gel, VSG = Very Slight Gel, PG = Partial Gel,
S-PG = Slight to Partial Gel.
GL = Gel Length, L = the height of liquid separated from the gel, measured when ampule was at vertical position.

EXAMPLE V

This example further demonstrates that 1,3,5-trioxane, another formaldehyde precursor which generates formaldehyde upon heating, produces gels with measurable tongue lengths only after a long period of time.

The runs were carried out the same as those described in Example II except that 1,3,5-trioxane was used in place of HMTA. The results presented in Table V below show that, using phenol and trioxane as crosslinkers, gels with measurable tongue lengths did not appear until after over 6 months of aging at 250° F., either at 2,000 ppm or 5,000 ppm. The system did not produce any gel at 200° F. in the period shown in the Table, but this system might have limited application at 250° F. This system was not tested at 300° F.

TABLE V

Gelatin of 0.7% Terpolymer In Synthetic Seawater with
Phenol and 1,3,5-Trioxane at 200° F. and 250° F.

| Temp X-linker Conc* (ppm) Aging Time (days) | \multicolumn{2}{c}{Tongue Length or Gel Length (GL) in Centimeters} | | |
|---|---|---|---|---|
| | 200° F. | | 250° F. | |
| | 2,000 | 5,000 | 2,000 | 5,000 |
| 0.05 | NG | NG | NG | NG |
| 0.10 | NG | NG | NG | NG |
| 0.18 | NG | T | NG | NG |
| 0.26 | NG | T | NG | NG |
| 1.2 | NG | T | NG | NG |
| 2.9 | NG | T | NG | NG |
| 4.1 | NG | NG | NG | NG |
| 5.3 | NG | NG | NG | NG |
| 10.9 | NG | T | NG | NG |
| 19.2 | NG | NG | NG | NG |
| 34.0 | NG | T | NG | NG |
| 52.0 | NG | NG | NG | NG |
| 199.0 | NG | NG | S-PG | PG |
| 259.0 | NG | NG | 17.0 GL | 15.3 |
| 433.0 | NG | NG | 2.2 | 7.2 |
| 664.0 | Terminated | Terminated | 2.3 | 7.8 |

T = Thick NG = No Gel, PG = Partial Gel, S-PG = slight to Partial Gel.
GL = Gel Length, L = the height of liquid separated from the gel, measured when ampule was at vertical position.

Although wishing not to be bound by theory, hexamethylenetetramine is probably converted to formaldehyde and ammonia upon heating. The in-situ produced formaldehyde is then coupled with phenol or an aminobenzoic acid compound as crosslinking system to form gels with an acrylamide-containing polymer. However, glyoxal, which is also converted to formaldehyde upon heating, does not form gels with phenol and an acrylamide-containing polymer (Table IV). The strong and stable gels formed by hexamethylenetetramine and phenol (Table II) as well as by hexamethylenetetramine and an aminobenzoic acid compound (Table III), therefore, represent unexpected and surprising results.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising: (1) hexamethylenetetramine which is present in said composition in the range of 0.03 to 1.0 weight %; (2) p-aminobenzoic acid which is present in said composition in the range of from 0.03 to 1.0 weight %; (3) a terpolymer of monomers consisting of N-vinyl-2-pyrrolidone, acrylamide, and sodium 2-acrylamido-2-methylpropane sulfonate wherein said monomers are provided in a 30:15:55 weight %, respectively, which is present in said composition in the range of from 0.2 to 4 weight %; and (4) water which makes up the rest of said composition.

2. A composition comprising: (1) hexamethylenetetramine which is present in said composition in the range of 0.03 to 1.0 weight %; (2) o-aminobenzoic acid which is present in said composition in the range of from 0.03 to 1.0 weight %; (3) a terpolymer of monomers consisting of N-vinyl-2-pyrrolidone, acrylamide, and sodium 2-acrylamido-2-methylpropane sulfonate wherein said monomers are provided in a 30:15:55 weight %, respectively, which is present in said composition in the range of from 0.2 to 4 weight %; and (4) water which makes up the rest of said composition.

3. A process comprising injecting a composition into a subterranean formation wherein said composition comprises: (1) hexamethylenetetramine which is present in said composition in the range of 0.03 to 1.0 weight %; (2) p-aminobenzoic acid which is present in said composition in the range of from 0.03 to 1.0 weight %; (3) a terpolymer of monomers consisting of N-vinyl-2-pyrrolidone, acrylamide, and sodium 2-acrylamido-2-methylpropane sulfonate wherein said monomers are provided in a 30:15:55 weight %, respectively, which is present in said composition in the range of from 0.2 to 4 weight %; and (4) water which makes up the rest of said composition.

4. A process comprising injecting a composition into a subterranean formation wherein said composition comprises: (1) hexamethylenetetramine which is present in said composition in the range of 0.03 to 1.0 weight %; (2) o-aminobenzoic acid which is present in said composition in the range of from 0.03 to 1.0 weight %; (3) a terpolymer of monomers consisting of N-vinyl-2-pyrrolidone, acrylamide, and sodium 2-acrylamido-2-methylpropane sulfonate wherein said monomers are provided in a 30:15:55 weight %, respectively, which is present in said composition in the range of from 0.2 to 4 weight %; and (4) water which makes up the rest of said composition.

* * * * *